March 15, 1966 C. M. LOVENDUSKY 3,240,312
CONVEYER FOR FLEXIBLE MATERIAL
Filed Jan. 24, 1963 4 Sheets-Sheet 2
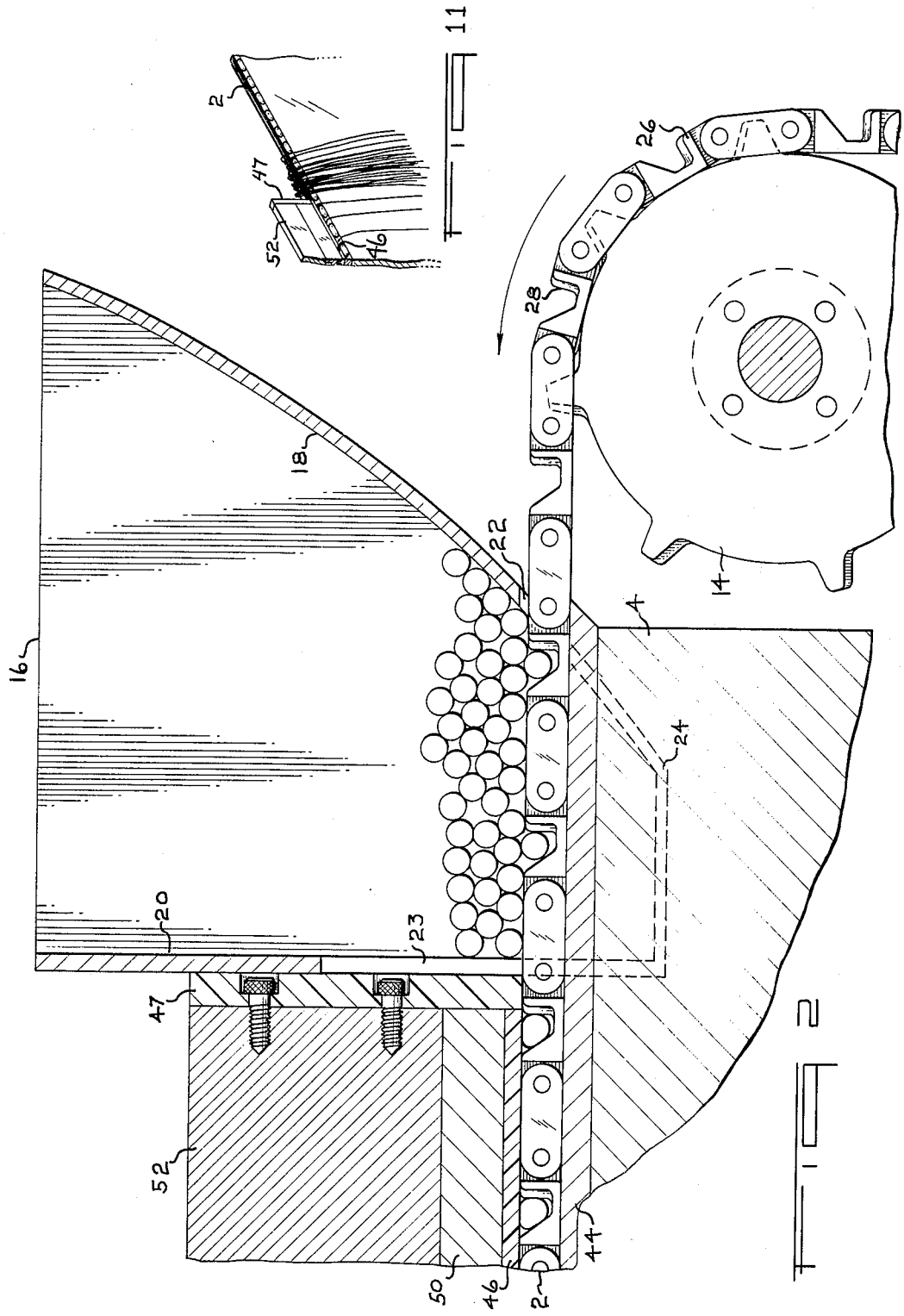

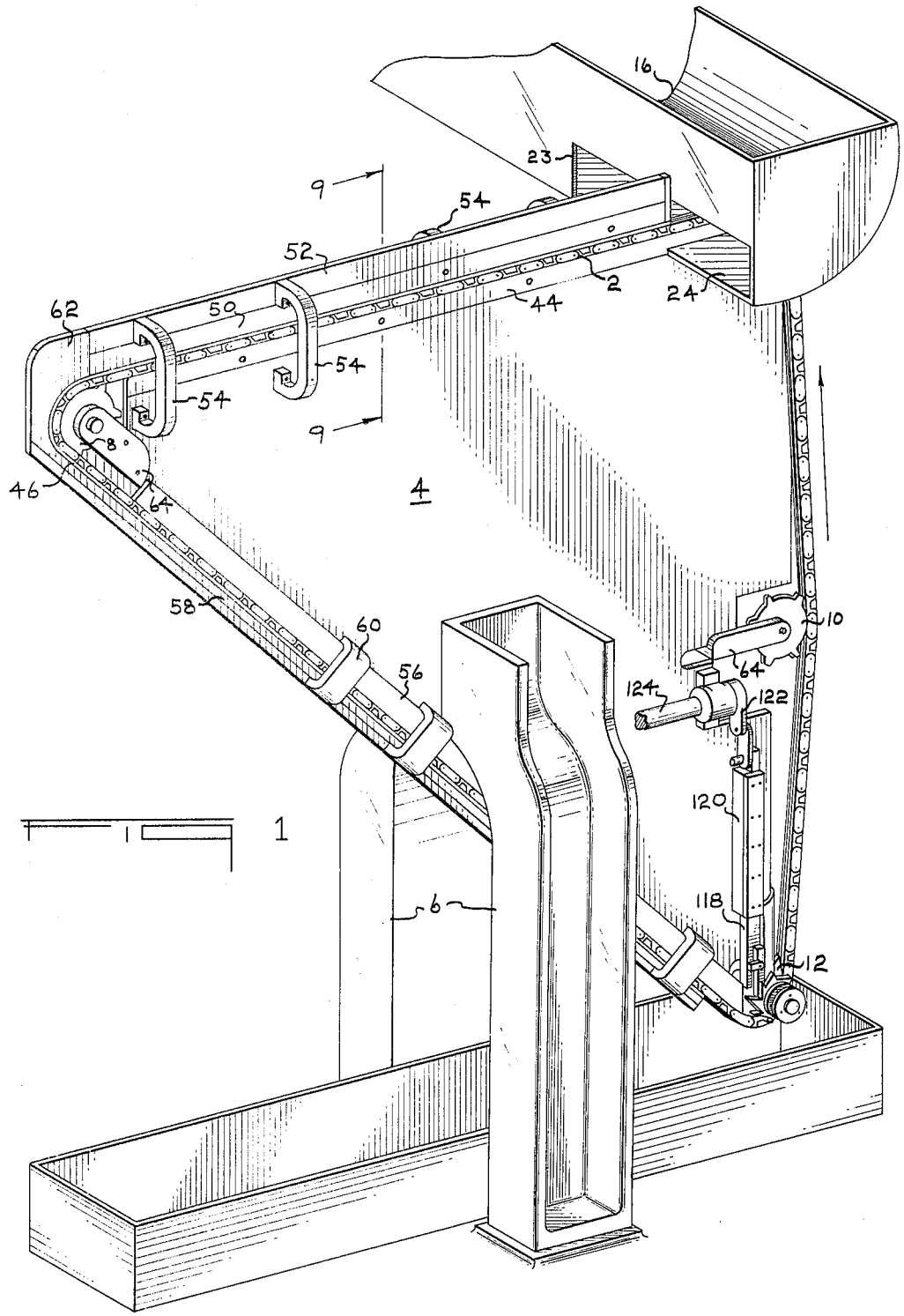

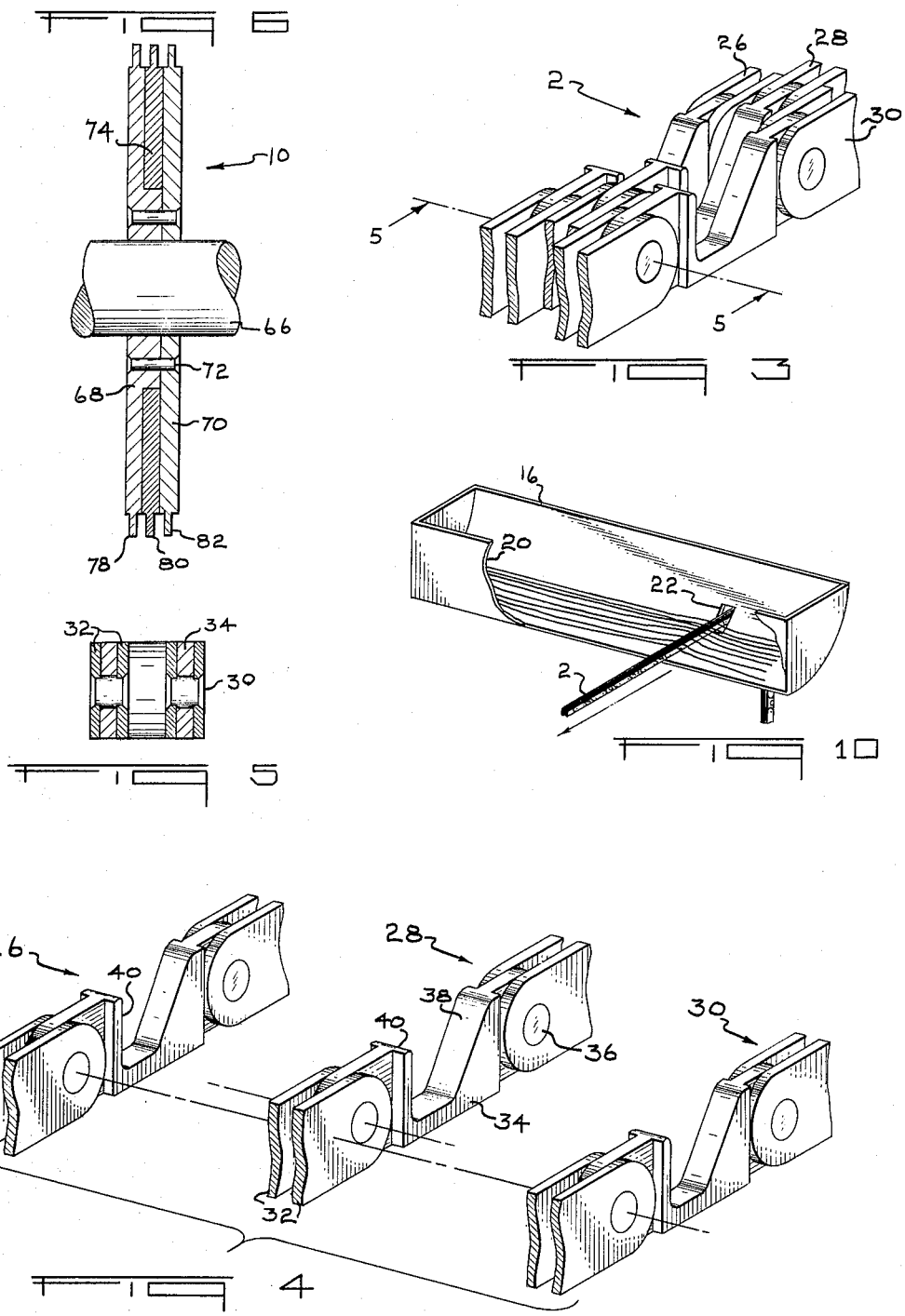

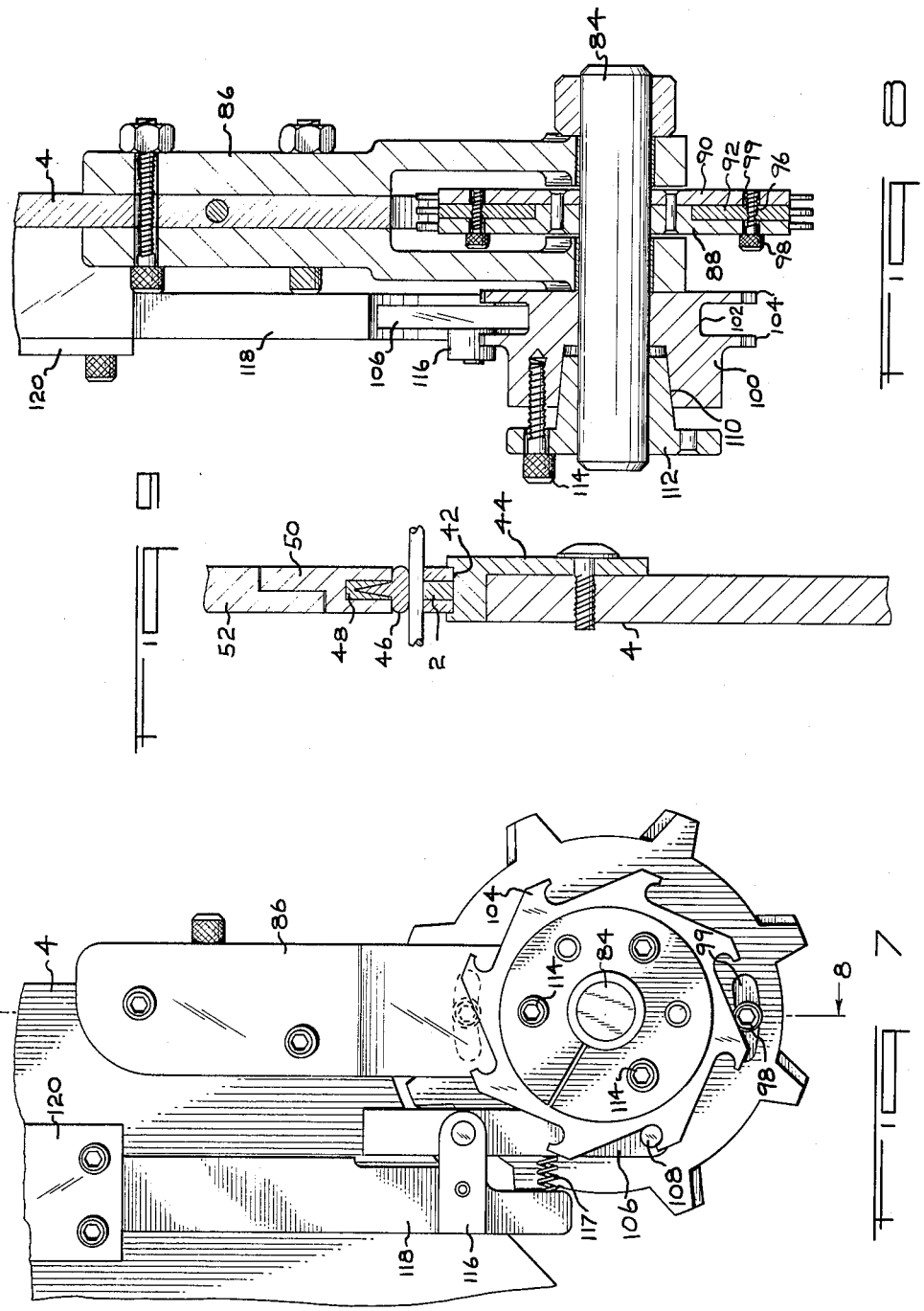

United States Patent Office 3,240,312
Patented Mar. 15, 1966

3,240,312
CONVEYER FOR FLEXIBLE MATERIAL
Charles M. Lovendusky, Enola, Pa., assignor to AMP Incorporated, Harrisburg, Pa.
Filed Jan. 24, 1963, Ser. No. 253,716
7 Claims. (Cl. 198—56)

This invention relates to conveying methods and apparatus for conveying individual lengths of limp flexible material laterally of their axes.

Self-loading conveyers for relatively firm and non-flexible elongated articles, such as cigars, rods, tubes, etc. have been developed in which it is merely necessary to fill a bin or hopper with a bundle of the articles being conveyed. These prior art devices are designed in a manner such that the conveyer passes through and beneath the bin or hopper, the individual articles load themselves into holding devices in the conveyer. Self-loading conveyers of this type are not suitable where the articles are limp or flexible rather than rigid and where the articles will not maintain themselves in precise parallelism in the bundle. The present invention is therefore directed to a conveyer particularly intended for usage with materials such as wire which can not be handled in the same manner and which will not behave in the same manner as a relatively elongated rigid member.

An object of the invention is to provide an improved conveyer for limp flexible materials. A further object is to provide a conveyer having adjustable gripping devices for the individual lengths of material conveyed thereby to permit adaptation to materials of varying diameters. A further object is to provide a conveyer for limp flexible materials having improved means for loading the individual lengths onto the conveyer. A further object is to provide a conveyer for wire or other limp flexible materials which can accommodate varying lengths of material without adjustment. A still further object is to provide an improved method of conveying limp flexible materials and of loading such materials onto a conveyer.

These and other objects of the invention are achieved in one specific embodiment in which the conveying means for the wire or other flexible material comprises a chain assembly composed of three identical conveyer chains in side-by-side relationship. The individual chains each have spaced-apart notches on their external sides and the chains are axially positioned relative to each other such that the individual notches are in alignment with each other. The individual notches of each chain thus define a composite notch in the chain assembly. The individual wires are held in the notches during conveying by means of a stationary pressure pad which bears against, and extends along, the external side of the chain assembly. The cross sectional areas of the composite notches, relative to the cross sectional areas of the wires, and their profiles are such that the wires are clamped in the notches by the pressure pad. Thus, a composite notch of a given cross sectional area will accommodate only a limited range of wire diameters.

When the notches of the individual chains are in exact registry with each other, the three notches will define a single composite notch in the chain assembly having a maximum cross sectional area which is the same as the area of the individual notches. However, if the center chain of the chain assembly is displaced longitudinally with respect to the two outside chains which remain in registry, the effective cross sectional area of the composite notch in the chain assembly is thereby reduced; that is, the one side of the composite notch is defined by the notches in the two outside chains while the other side of the composite notch is defined by the notch in the center chain. Thus, when the diameter of the material being handled is changed so that the cross sectional area of the composite notch must be changed, it is thus only necessary to adjust the position of the center chain of the assembly relative to the outside chains.

The wires may be loaded into the notches by means of a bin through which the chain assembly passes at a level above the floor of the bin. A bundle of wires can thus be laid in the bin and across the chain assembly so that as the chain moves through the bin, an individual wire will fall into each of the notches in the chain assembly. An outlet for the wires is provided in the form of an opening on one side of the bin through which the individual wires in the notches are dragged as the chain emerges from the bin.

The principles of the invention are applicable wherever it is desired to provide a conveyer device for individual lengths of wire or similar flexible material; for example, in the co-pending application of Charles Lovendusky and Robert Long, Serial No. 236,090, filed November 7, 1962, there is shown an automatic machine for manufacturing electrical leads which utilizes a conveyer in accordance with the invention. The principles of the instant invention are also employed in my co-pending application, Serial No. 248,111, now abandoned, which claims a conveyer having an improved arrangement for stacking wires handled by the conveyer.

In the drawing:

FIGURE 1 is a perspective view of a conveyer in accordance with the present invention.

FIGURE 2 is a fragmentary sectional view showing the manner in which the conveyer chain assembly passes through the wire storage bin and illustrating the manner in which the individual wires are loaded onto the conveyer.

FIGURE 3 is a perspective view showing a section of the conveyer chain assembly.

FIGURE 4 is a view similar to FIGURE 3 but showing the three individual chains of the chain assembly exploded from one another.

FIGURE 5 is a view taken along the lines 5—5 of FIGURE 3.

FIGURE 6 is a sectional view taken centrally through one of the idler sprockets over which the chain assembly passes.

FIGURE 7 is a side view showing the drive sprocket over which the conveyer chain passes and which imparts indexing motion to the conveyer chain.

FIGURE 8 is a view taken along the lines 8—8 of FIGURE 7.

FIGURE 9 is a view taken along the lines 9—9 of FIGURE 1 and illustrating the manner in which the individual lengths are retained in the notches in the conveyer chain assembly.

FIGURE 10 is a fragmentary perspective view illustrating the manner in which the wires in the bundle rest upon the conveyor chain assembly.

FIGURE 11 is a fragmentary perspective view showing an alternative embodiment of the invention.

FIGURE 1 shows a conveyer for limp flexible wires which is movable along a closed circuit triangular path, this particular conveyor having been developed for use in a fully automatic lead making machine as disclosed in application Serial No. 236,090, referred to above. In FIGURE 1 the various wire positioning devices and the terminal crimping devices shown in the above-identified application have been omitted in the interest of clarity and it will be understood that these or other wire working devices might be provided along the path of the conveyer to perform various operations on the wire.

In FIGURES 1 and 2, the conveyer chain assembly 2 moves along a triangular path defined by the edges of a triangular frame plate 4 which is supported in an upright position by means of support legs 6. The chain assembly is guided around the upper apices of its path by means of sprockets 8, 14 and is guided along the righthand side of its path by means of an idler sprocket 10. Intermittent motion is imparted to the conveyer chain assembly by means of a driven sprocket 12 at the lowermost apex of the conveying path. The individual lengths of wire are loaded onto the chain from a bin 16 having a sloping back wall 18 and a flat upright front wall 20. Chain assembly 2 passes through a slot 22 in back wall 18 and through the bin at a level above the floor 24 emerging from the bin through an opening 23 which permits withdrawal of the individual lengths from the bundle contained in the bin.

Referring now to FIGURES 3, 4 and 5, the chain assembly 2 comprises three identical chains 26, 28, and 30 in side-by-side relationship. Each chain has alternate links 34 which have notches on their upper side, these notches having one sloping side 38, and one shear or straight side 40. Wire holding links 34 are pivotally connected at each of their ends by means of pins 36 to pairs of parallel link plates 32. When the three chains are in side-by-side relationship as shown in FIGURE 3, the three individual notches of the wire holding links 34 will define a composite notch in the chain assembly, the profile of which will be determined by the relative position of the center chain 28 with respect to the outside chains 26, 30. Thus, in FIGURE 3, the center chain 28 is displaced longitudinally a short distance with respect to the outside chains so that the profile of the composite notch in the chain assembly is somewhat smaller than the profile of the individual notches of the individual chains. Obviously then, movement of the center chain 28 in FIGURE 3 leftwardly so that its notch would be in registry with the notches of the chains 26, 30 would result in making the composite notch in the chain assembly somewhat larger. In this manner, the effective cross sectional area of the notch in the chain assembly can be changed to accommodate wires of varying diameters as is more fully explained below.

Referring now to FIGURE 9, the chain assembly is guided along the upper side of the triangular frame plate 4 by means of a channel 42 on the upper edge of a guide track plate 44 which in turn is secured to the upper side of the frame 4. The individual wires are held in their respective notches in the chain assembly by means of a pressure pad comprising a strip of resilient material 46 coextensive with the chain on its upper side. This strip is pinched or otherwise held in an insert 48 in a chain retainer plate 50 which is also coextensive with the chain on the upper side of the conveying path. Plate 50 in turn is secured to a mounting plate 52 which is held in position above the chain by means of C-shaped brackets 54 having one of their arms secured to the retainer plate 50 and having their lower arms secured to the frame plate 4. Along the sloping hypotenuse of conveying path, a similar means is provided for guiding the conveyer chain assembly and for retaining the individual wires in the notches; thus, along this hypotenuse side, there is provided a guide track plate 56 similar to the plate 44, a retainer plate 58 which is similar to the plate 50, and brackets 60 which secure the plate 58 to the frame 4. The chain is guided around the lefthand apex of its path and around the sprocket 8 by means of a corner piece 62 having the resilient material 46 therein so that the individual wires will be held in position as they are carried around this apex.

As shown in FIGURE 2, the mounting plate 52, the retainer plate 50, and the resilient strip 46 extend up to the side 20 of the bin 16. Advantageously, a bar 47 of a relatively firm plastic material is secured to the end of these members 50, 52 and bears against the external surface of the wall 20 of the bin. This bar extends downwardly towards and bears against the upper edge of the chain assembly. The provision of this bar of relatively firm plastic material assists in permitting the chain to withdraw the individual wires from the bundle as the individual notches in the chain pass through the opening 23 and travel under the strip of resilient retaining material 46.

The idler sprockets 8, 12, and 14 (FIGURE 6) are substantially alike so that the description of one will suffice for all three. These sprockets are mounted on rotatable stub shafts 66 extending between parallel spaced-apart ears of brackets 64 which extend from and are secured to the frame plate 4. Each sprocket comprises a first plate 68, which is relatively thicker in its hub portion than at its periphery, and a flat plate 70, these two plates being secured together by rivets 72. Plate 70 is thus clamped against the hub portion of plate 68 so that a circumferential groove is formed between the plates in which a third sprocket plate 74 is contained. This third sprocket plate is not rigidly held between the plates 68, 70 but is free to rotate relative to the two plates 68, 70 thereby to permit adjustment of the central chain 28 relative to the outside chains in a manner described below. The three plates 68, 74, and 70 are provided with suitable spaced-apart sprocket teeth 78, 80 and 82 at evenly spaced intervals on their peripheries.

Referring now to FIGURES 7 and 8, the drive sprocket is also composed of a pair of plates 88 and 90 and a intermediate plate 92 which plates are similar to those shown in FIGURE 6. In the drive sprocket however, means are provided for adjustably clamping the center plate 92 to the plates 88 and 90, the disclosed clamping means comprising machine screws 98 which extend through arcuate slots 99 in the plates 88 and 90 and through threaded openings 96 in plate 92 so that when these screws are tightened, the central plate 92 is fixed with respect to the plates 88, 90.

If it is desired to adjust the position of the central chain 28 relative to the outside chains of the chain assembly, it merely becomes necessary to loosen the fasteners 98, to move the central chain until the notch in the chain assembly is of the desired size, and then re-tighten the screws 98. The central chain will then be kept in its relative position by virtue of the relative positions of the sprocket teeth on the plates 88, 90, 92 on the drive sprocket. The idler sprockets need not be adjusted since the central sprocket plates 74 of these sprockets will automatically change their positions when the central chain 28 is moved with respect to the outside chains 26, 30.

The drive sprocket is secured to a shaft 84 which is mounted for rotation between a pair of ears on the lower end of a bracket 86 secured to the frame plate 4. Shaft 84 extends externally of the bracket 86 and has a ratchet wheel 100 on its end. Spaced apart ratchet teeth 104 extend from the periphery of the ratchet wheel and a circumferential groove 102 is provided between these teeth. Ratchet wheel 100 is clamped to the shaft 84 by means of a wedge clamp 112 having a conical surface 110 which is received within a complementary conical recess on the end of the sprocket wheel 100. Screws 114 extend through flanges on the wedge 112 and into the hub of the sprocket wheel so that as the wedge is drawn into the conical opening of the ratchet wheel, the wedge, and hence the ratchet wheel itself, are clamped to the shaft 84.

Intermittent indexing motion is imparted to the sprocket wheel by means of a pawl 106 which extends tangentially of the sprocket wheel in the circumferential groove 102. On its lower end, pins 108 project from the sides of the pawl 106 and register with the teeth of the sprocket wheel. On its upper end this pawl is pivotally mounted between a pair of ears 116 extending from the end of a connecting rod 118. A spring 117 normally biases the pawl in a counterclockwise direction as viewed in FIGURE 7 and into engagement with the teeth of the ratchet wheel although this spring permits upward movement of the pawl from the position of FIGURE 7. Connecting rod 118, to which the mounting ears 116 are secured, extends through a guide and housing 120 to a crank arm 122 on the end of a rotating shaft 124. It will thus be apparent that continuous rotation of the shaft will cause periodic reciprocation of the connecting rod 118 and thereby the sprocket will be periodically indexed to move the conveyer chain assembly along its path.

In use, it is merely necessary to lay a bundle of wires in the bin with their axes extending across the conveyer chain assembly as shown in FIGURE 10. It will be noted from this figure that the chain assembly passes through the bin at a level above the floor thereof so that the individual wires of the bundle will rest upon the chain and will be lightly urged against the external side of the chain assembly by gravity. As the chain passes through the slot in the bin 22 and beneath the bundle of wires, an individual wire from the bundle will be forced or will fall by gravity into each of the notches of the chain assembly. The width of the notches being such that two wires can not enter a single notch. As a particular notch then moves from the bin past the rod 47 of plastic material, the individual wire is clamped in the notch by the resilient clamping material above the chain and is withdrawn from the bundle.

A discussion is presented below of some of the important considerations and dimensional limitations of the wires, the notches, and the conveyer chain which contribute to the successful practice of the invention. In this discussion, the width of the notches in the chain, the length of these notches, and the thickness of the chain assembly are referred to and discussed with relation to the wire size. It should be understood that the width of the notches refers to the effective distance between the side 40 of the center chain 28 and the sloping sides 38 of the outside chains 26, 30. The length of the notches is intended to refer to their length as measured between the outwardly facing sides of the chains 26, 30. The length of the notches is therefore constant regardless of the position of the center chain 28 and is equal to the width or thickness of the chain assembly.

The wires of the bundle will normally be in substantial parallelism with each other and will ordinarily extend substantially normally of the conveyer 2, however, perfect parallelism of all of the wires with each other can not be assumed nor can it be assumed that each individual wire will extend precisely normally of the conveyer. By reason of these considerations, the conveyer chain should be relatively narrow in comparison to the length of the wires and their diameters in order to ensure loading of the individual wires into the notches. This requirement can be understood if it is assumed that the conveyer passes beneath a wire which does not extend precisely normally of the chain but extends slightly obliquely of the chain. Under these conditions the wire will fall into a notch because of the fact that the short section of wire resting on the chain will not be sufficiently long to bridge the notch; i.e. to be suspended above it by the chain on each side of the notch. If the notch is long however (as would be the case with a wide conveyer), the obliquely extending wire will tend to bridge the notch rather than fall into it. It has been found in practice, for example, that a chain assembly of the type shown in the drawing ⅜" thick (i.e. each individual chain being ⅛" thick) can be loaded successfully with wires as small as ¹⁄₁₆" in diameter. These conditions do not necessarily set forth the lower limit on the wire diameter usable with a chain of this thickness, however, they are close to this lower limit. An additional factor to be considered is that where the center chain is not in registry with the outside chains, the undesirable bridging effect referred to above which prevents loading is discouraged because the trailing sides of the notches of the outside chains are behind (relative to the direction of chain movement) the trailing side of the notch of the center chain. These sides of the notches in the outside chains are not, therefore, available to support the portions of the obliquely extending wire at the sides of the chain.

In general it can be stated that the width of the conveyer and, therefore, the length of the notches, should be of about the same order of magnitude as the diameter of the individual wires or other material. The expression "same order of magnitude" as used above is intended to include, but not be precisely limited to, the instance of a ⅜" thick conveyer and a wire ¹⁄₁₆" in diameter cited above. The width of the conveyer can also be defined with relation to the length of the individual lengths of material as an insignificant fraction thereof. If the conveyer had a width substantially equal to the length of the individual lengths of wire, it would be virtually impossible for the individual wires to fall into the notches unless they were aligned perfectly with the notches.

An important feature of the invention which contributes to successful extraction of the individual wires from the bundle is that each wire is clamped in its respective notch in the conveyer after it has passed the plastic bar 47. In the disclosed embodiment, such clamping of the wires is effected by the resilient pressure pad 46 and by virtue of the fact that the wires extend slightly above the upper surface of the chain as indicated in FIGURE 2. The importance of this clamping of the individual wires can be appreciated from the fact that as the chain moves leftwardly in FIGURES 2 and 10 from the bin, only the section of the wire which is lodged in the notch will move with the chain and the laterally extending ends of the wire will remain in the bin although these end portions may also move partially towards the bar 47. Thus, after a particular notch has left the bin and passed beneath the bar 47 all transversely extending portions of the wire in that notch must be dragged through the opening 23 from the bin and against frictional forces imposed by the overburden of the bundle of wires on the individual wire. If the individual wire were not clamped in its notch, the possibility would exist that that individual wire would not be dragged from the bin but would rather be pulled relatively out of its notch during further movement of the chain.

From the foregoing discussion it will also be apparent that the chain must pass beneath the bundle of wires at some location intermediate the ends of the bundle so that the individual wires will not move relatively out of their respective notches during movement of the chain. This limitation can be appreciated with reference to FIGURE 10 which shows a substantial portion of each wire of the bundle extending rightwardly of the conveyer 2. During movement of the conveyer from one side of the bin to the frontal side 16, it can be assumed that an individual notch will be occupied by an individual wire shortly after the notch enters the bin through the slot 22. During movement of this individual notch towards the front of the bin 20, it can be assumed that there will be some relative movement of the wire with respect to the notch due to the frictional drag of the bundle of the individual wire. Obviously then, the wires should extend rightwardly of the conveyer 2 (as viewed in FIGURE 10) a distance such that the individual wire will not be dragged from its respective notch during this period. It will thus be apparent that the conveyer can pass under the bundle at any point intermediate its ends so long as a sufficient length of each wire extends laterally of the conveyer on each side to accommodate this relative motion between the individual wires and the notches in which they are lodged.

Several alternative methods and arrangements for practicing the invention will be apparent from a consideration of the factors discussed above and from the description of the specific apparatus and embodiment disclosed. For example, the bin can be entirely eliminated as shown in FIGURE 11 and the bundle of wires can merely be draped over the chain at a location adjacent to the plastic bar 47. An arrangement of this type satisfies all of the conditions necessary for practicing the invention since the conveyer chain passes beneath the bundle and the individual notches are filled with wires during such movement of the chain. A further modification which can be effected concerns the clamping of the individual wires in their respective notches after they have left the bundle. Where the wires are insulated with a relatively thick and compressable plastic insulation, the resilient pressure pad 46 could be replaced by a rigid bar extending parallel to and adjacent to the upper surface of the conveyer. With this arrangement, the wires are clamped in their notches by virtue of the compressability of the insulation which is slightly deformed elastically by the bar extending parallel to the chain.

While the notches are disclosed as being on the external side of the conveyer chain, it will be apparent that these notches could be provided on the opposite side, that is on the inside surface of the conveyer. For example, the conveyer can be made to travel upon an oval path in a clockwise direction and the bundle of wires loaded onto the conveyer at a location on the lower side of the oval. The wires would then be loaded into notches provided on the inside edge of the conveyer chain.

If desired, an external load, for example a spring applied load can be impressed upon the bundle of wires in order to encourage and facilitate loading of the individual wires into the notches. It has been found in practice, however, that the weight of the bundle itself is usually sufficient to force the individual wires into notches and that every wire in the bundle will fall into one of the notches of the chain even when the bundle is almost depleted.

For best results as regards loading of the individual wires into the notches of the chain assembly, the downward force exerted on the layer of wires resting on the chain assembly should not be unduly high. If this layer of wires is subjected to unduly high forces due to the weight of the upper layer of wires, extraction of the individual wires from the bundle becomes difficult. The sloping side 18 of the bin is provided for the purpose of limiting the amount of force imposed on the lower layer of wires in view of the foregoing consideration. This sloping side also promotes downward movement of the upper layers of wires without formation of a bridge of jammed wires which would extend between the sides 18, 20.

It will be noted in FIGURE 2 that the chain assembly is oriented in a manner such that the shear side of the notch in the central chain 28 constitutes the trailing side of the notch in the chain assembly while the sloping sides of the two outside chains 26, 30 constitute the leading side of the notch in the chain assembly. In the type of chain assembly shown, this arrangement is preferred since this arrangement provides only one trailing side to the notch in the chain assembly by means of which the individual wires are pushed as the chain moves under the bundle. This arrangement avoids the possibility of two wires becoming ledged in any one of the notches since only one wire can be pushed by the shear side 40 of the central chain of the assembly.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. A self loading conveyer for extracting individual lengths of flexible material such as wire from a bundle of lengths of material and conveying said individual lengths along a predetermined path, said apparatus comprising a conveyer movable along said path and having spaced-apart notches on one side thereof and extending across said conveyer, said conveyer having a thickness as measured transversely of its length which is an insignificant fraction of the total length of said lengths of material and said conveyer having a thickness which is of substantially the same order of magnitude as the diameter of said material, and stationary retaining means extending parallel to and against said one side of said conveyer for a portion of said path whereby, upon positioning said bundle in overhanging relationship to said conveyer at a location adjacent to said stationary retaining means with said bundle supported by said conveyer, an individual length of said material enters each of said notches, and upon movement of each notch under said retaining means, the one length of material positioned therein is clamped to said conveyer and said one length is extracted from said bundle upon further movement of said conveyer.

2. Apparatus as set forth in claim 1 including bin means for holding said bundle, said bin means being disposed upstream, relative to the direction of movement of said conveyer, from said stationary retaining means, said path extending through said bin means at a level above the floor thereof.

3. A conveyer assembly comprising three flexible conveyers in side-by-side relationship with each other, notches in the upper sides of said conveyers, said notches being in substantial alignment with each other, and means for adjusting the relative position of the notches in the center one of said conveyers with respect to the outside conveyer thereby to change the effective size of said notches.

4. A conveyer chain assembly for individual lengths of flexible filimentary material, said chain assembly comprising three identical chains in side-by-side relationship, said chains having spaced-apart individual notches on their upper sides and being in substantial alignment with each other whereby said individual notches are in substantial alignment to form a plurality of spaced-apart notches in said chain assembly, means for moving said chain along a conveying path, and means for adjusting the center chain of said chain assembly longitudinally with respect to the outside chains thereby to permit changing of the effective size of said notches of said chain assembly and to adapt said assembly to materials of different cross sectional areas.

5. A self-loading conveyer for extracting individual lengths of flexible material such as wire from a bundle of lengths of said material and conveying said individual lengths along a predetermined path, said apparatus comprising, bundle holding means for holding a bundle of said lengths in a horizontal attitude a conveyer chain assembly movable through said bundle holding means at an elevation such that said bundle rests upon said conveyer with the portions thereof which are in engagement with said conveyer elevated above the ends of said bundle, said conveyer chain assembly comprising a plurality of individual chains in side-by-side relationship, said chains each having spaced-apart notches on their upper sides, means for adjusting the position of one of said chains relative to said chain assembly thereby to change the effective size of said notches and to adapt said conveyer to the handling of material of different diameters, and pressure pad means bearing against said upper side of said conveyer and extending from a location adjacent to said bundle holding means downstream, with respect to the path of movement of said conveyer, whereby, individual lengths of said material enter said notches during passage of said conveyer beneath said bundle and each length is clamped in its respective notch during movement of said conveyer and is dragged and extracted from said bundle.

6. A self-loading conveyer for extracting individual lengths of flexible material such as wire from a bundle of lengths of said material and conveying said individual lengths along a predetermined path, said apparatus comprising, bundle holding means for holding a bundle of said lengths in a horizontal attitude, a conveyer chain assembly movable through said bundle holding means at an elevation such that said bundle rests upon said conveyer with the portions thereof which are in engagement with said conveyer elevated above the ends of said bundle, said conveyer chain assembly comprising three identical chains in side-by-side relationship, each of said chains having spaced-apart notches on one side whereby composite notches are formed when said chains are aligned with their individual notches in registry, and means for adjusting the position of the center one of said chains relative to the outside chains thereby to adjust effective size of said composite notches, and pressure pad means bearing against said one side of said chain assembly and extending from a location adjacent to said bundle holding means downstream, with respect to the path of movement of said conveyer, whereby, individual lengths of said material enter said composite notches during passage of said conveyer beneath said bundle and each length is clamped in its respective composite notch during movement of said conveyer and is dragged and extracted from said bundle.

7. A self-loading conveyer for extracting individual lengths of flexible material such as wire from a bundle of lengths of material and conveying said individual lengths along a predetermined path, said apparatus comprising a conveyer movable along said path and having spaced-apart notches on one side thereof and extending across said conveyer, said conveyer having a thickness as measured transversely of its length which is an insignificant fraction of the total length of said lengths of material, said notches having a depth and a cross-sectional area sufficient to accommodate substantially the entire cross section of one of said lengths of material, and stationary retaining means extending parallel to and against said one side of said conveyer for a portion of said path whereby, upon positioning said bundle in overhanging relationship to said conveyer at a location adjacent to said stationary retaining means with said bundle supported by said conveyer, an individual length of said material enters each of said notches, and upon movement of each notch under said retaining means, the one length of material positioned therein is clamped to said conveyer and said one length is extracted from said bundle upon further movement of said conveyer.

References Cited by the Examiner
UNITED STATES PATENTS

| | | | |
|---|---|---|---|
| 808,067 | 12/1905 | Briggs | 198—56 |
| 1,913,001 | 6/1933 | Ross | 198—168 |
| 2,889,959 | 6/1959 | Landgraf | 221—42 |
| 2,931,292 | 4/1960 | Ackley | 198—131 |
| 2,987,170 | 6/1961 | Hamilton | 198—213 |

SAMUEL F. COLEMAN, *Primary Examiner.*
ERNEST A. FALLER, JR., *Examiner.*